United States Patent
Mi et al.

(10) Patent No.: US 12,063,613 B2
(45) Date of Patent: Aug. 13, 2024

(54) SYSTEM AND METHOD FOR DETERMINING TIMING ADVANCE VALIDITY FOR A COMMUNICATION METHOD AND DEVICE

(71) Applicant: Huawei Technologies Co., Ltd., Shenzhen (CN)

(72) Inventors: Xiang Mi, Beijing (CN); Xiaolei Tie, Shanghai (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 696 days.

(21) Appl. No.: 17/171,583

(22) Filed: Feb. 9, 2021

(65) Prior Publication Data
US 2021/0168746 A1 Jun. 3, 2021

Related U.S. Application Data

(63) Continuation of application No. PCT/CN2018/100079, filed on Aug. 10, 2018.

(51) Int. Cl.
*H04W 56/00* (2009.01)
*H04B 17/318* (2015.01)
*H04W 24/10* (2009.01)

(52) U.S. Cl.
CPC ........ *H04W 56/005* (2013.01); *H04B 17/318* (2015.01); *H04W 24/10* (2013.01); *H04W 56/006* (2013.01)

(58) Field of Classification Search
CPC . H04W 56/005; H04W 24/10; H04W 56/006; H04W 56/0005; H04W 56/0055; H04W 56/0045; H04B 17/318
See application file for complete search history.

(56) References Cited

U.S. PATENT DOCUMENTS 10,225,815 B2 * 3/2019 Basu Mallick ... H04W 56/0045
10,667,323 B1 * 5/2020 Shih ..................... H04W 76/27
(Continued)

FOREIGN PATENT DOCUMENTS

CN 102752846 A 10/2012
CN 107105496 A 8/2017
(Continued)

OTHER PUBLICATIONS

"Transmission of Data Grant-Free in Inactive State," Agenda item: 9.2.2.1, Source: Sierra Wireless, Document for: Discussion and Decision, 3GPP TSG RAN WG2 Meeting #96, R2-168595, Reno, Nevada, USA Nov. 14-18, 2016, 10 pages.
(Continued)

*Primary Examiner* — Natasha W Cosme
*Assistant Examiner* — Yewon Kim
(74) *Attorney, Agent, or Firm* — SLATER MATSIL, LLP

(57) ABSTRACT

A communication method and device, the method including obtaining, by a terminal device, a timing advance (TA), determining, by the terminal device according to a preset rule and first information, whether the TA is valid, where the first information includes a first parameter, and wherein the first parameter is information related to a location of the terminal device, and performing at least one of determining, by the terminal device, in response to the TA being invalid, that uplink data transmission cannot be performed, or determining, by the terminal device, in response to the TA being valid, that the TA can be used for uplink data transmission.

20 Claims, 4 Drawing Sheets

(56) References Cited

U.S. PATENT DOCUMENTS

| | | | |
|---|---|---|---|
| 11,089,618 B2 | 8/2021 | Liu et al. | |
| 2014/0003279 A1 | 1/2014 | Ren | |
| 2015/0003430 A1 | 1/2015 | Hole et al. | |
| 2021/0321413 A1* | 10/2021 | Shin | H04W 72/23 |

FOREIGN PATENT DOCUMENTS

| | | | |
|---|---|---|---|
| CN | 107995636 A | 5/2018 | |
| CN | 108135029 A | 6/2018 | |
| CN | 108337728 A | 7/2018 | |
| EP | 3346776 A1 | 7/2018 | |
| WO | 2018070908 A1 | 4/2018 | |
| WO | 2020026154 A1 | 2/2020 | |
| WO | WO-2020031043 A1 * | 2/2020 | H04W 56/003 |

OTHER PUBLICATIONS

"NB-IoT Idle Mode SPS for M2M Regular Reporting," Agenda Item: 9.13.5, Source: Mediatek Inc., Document for: Discussion and decision, 3GPP TSG-RAN WG2 Meeting #100, R2-1713504, Reno, USA, Nov. 27-Dec. 1, 2017, 5 pages.

"Rel-16 enhancements for NB-IoT," Source: Ericsson, Huawei, Document for: Approval, Agenda Item: 10.1.3, 3GPP TSG RAN Meeting #80, RP-181451, La Jolla, USA, Jun. 11-14, 2018, 4 pages.

* cited by examiner

SYSTEM AND METHOD FOR DETERMINING TIMING ADVANCE VALIDITY FOR A COMMUNICATION METHOD AND DEVICE

CROSS-REFERENCE TO RELATED APPLICATIONS

This application is a continuation of International Application No. PCT/CN2018/100079, filed on Aug. 10, 2018, the disclosure of which is hereby incorporated herein by reference in its entirety.

TECHNICAL FIELD

This application relates to the field of communications technologies, and in particular, to a communication method and a device.

BACKGROUND

In a same cell, locations of different user equipment (UE) are different, and times at which uplink data sent by the UEs arrives at an evolved NodeB (eNB) may be different. This causes interference between users. Therefore, the eNB estimates uplink timing of a UE, and sends a timing advance (TA) to the UE based on the estimated uplink timing, and the UE adjusts an uplink transmission time based on the TA, so that uplink data sent by the UEs in the cell arrives at the eNB at a same time.

An uplink transmission in preconfigured resources solution of the UE is studied in narrowband internet of things (NB-IoT). An uplink transmission in preconfigured resources is as follows. When the UE needs to send uplink data, the eNB does not need to perform uplink scheduling for the UE, and the UE directly performs uplink transmission on a preconfigured transmission resource in a prespecified sending manner. In the uplink transmission in preconfigured resources, the UE needs to have a valid TA before performing uplink transmission in preconfigured resources. However, currently, the TA of the UE in the uplink transmission in preconfigured resources is not accurate.

SUMMARY

Embodiments of this application provide a communication method and a device, to resolve a prior-art problem that a TA of UE in an uplink transmission in preconfigured resources is not accurate.

According to a first aspect, an embodiment of this application provides a communication method, including A terminal device obtains a timing advance TA. The terminal device determines, according to a preset rule and first information, whether the TA is valid, where the first information includes a first parameter, and the first parameter is information related to a location of the terminal device. When the TA is invalid, the terminal device determines that uplink data transmission cannot be performed. When the TA is valid, the terminal device determines that the TA can be used for uplink data transmission. In this embodiment of this application, the terminal device determines, based on the information related to the location of the terminal device, whether the TA is valid, so as to avoid, to some extent, a case of false alarm in which the terminal device determines an invalid TA as valid when a TA timer does not expire but a moving distance of the terminal device is excessively long. This can also avoid, to some extent, a case of miss detection in which the terminal device determines a valid TA as invalid when the TA timer expires but the moving distance of the terminal device is very short, thereby improving accuracy of determining, by the terminal device, whether the TA is valid.

In a possible design, before the terminal device determines, according to a preset rule and first information, whether the TA is valid, the terminal device may measure a current reference signal received power (RSRP) of a serving cell, where the first parameter is the current RSRP that is of the serving cell and that is obtained by the terminal device through measurement. In the foregoing design, because the RSRP can reflect a distance between the terminal device and a network device to some extent, a relatively great change of the RSRP indicates a relatively long moving distance of the terminal device, and a relatively small change of the RSRP indicates a relatively short moving distance of the terminal device. Therefore, the terminal device determines, based on the current RSRP that is of the serving cell and that is obtained by the terminal device through measurement, whether the TA is valid, and accuracy of determining whether the TA is valid can be effectively improved.

In a possible design, that the terminal device determines, according to a preset rule and first information, whether the TA is valid may include If an absolute value of a difference between the first parameter and a reference value is greater than or equal to a first difference, the terminal device determines that the TA is invalid. If an absolute value of a difference between the first parameter and the reference value is less than the first difference, the terminal device determines that the TA is valid. The first difference is preconfigured by the terminal device or is sent by a network device to the terminal device. In the foregoing design, the terminal device may determine a moving distance of the terminal device by using the difference between the first parameter and the reference value. A larger absolute value of the difference indicates a longer moving distance, and a smaller absolute value of the difference indicates a shorter moving distance. Therefore, whether the TA is valid is determined based on the absolute value of the difference between the first parameter and the reference value, and accuracy is relatively high.

In a possible design, that the terminal device determines, according to a preset rule and first information, whether the TA is valid may include If an absolute value of a difference between the first parameter and the reference value is greater than a first difference, the terminal device determines that the TA is invalid, or if an absolute value of a difference between the first parameter and the reference value is less than or equal to the first difference, the terminal device determines that the TA is valid. In the foregoing design, the terminal device may determine a moving distance of the terminal device by using the difference between the first parameter and the reference value. A larger absolute value of the difference indicates a longer moving distance, and a smaller absolute value of the difference indicates a shorter moving distance. Therefore, whether the TA is valid is determined based on the absolute value of the difference between the first parameter and the reference value, and accuracy is relatively high.

In a possible design, the first information further includes information about a TA timer, and that the terminal device determines, according to a preset rule and first information, whether the TA is valid may include If the first information meets a first condition, the terminal device determines that the TA is valid, where the first condition is that the TA timer does not expire, and an absolute value of a difference between the first parameter and a reference value is less than or equal to a second difference. The second difference is preconfigured by the terminal device or is sent by a network device to the terminal device. If the first information does not meet the first condition, the terminal device determines that the TA is invalid. In the foregoing design, the terminal device determines, with reference to the TA timer and the difference between the first parameter and the reference value, whether the TA is valid, and accuracy is relatively high.

In a possible design, the first information further includes information about a TA timer, and that the terminal device determines, according to a preset rule and first information, whether the TA is valid may include If the first information meets a second condition, the terminal device determines that the TA is valid, where the second condition is that the TA timer does not expire, and an absolute value of a difference between the first parameter and the reference value is less than the second difference. If the first information does not meet the second condition, the terminal device determines that the TA is invalid. In the foregoing design, the terminal device determines, with reference to the TA timer and the difference between the first parameter and the reference value, whether the TA is valid, and accuracy is relatively high.

In a possible design, if the first information meets a third condition, the terminal device may adjust the TA timer, where the third condition includes that the TA timer does not expire, and an absolute value of a difference between the first parameter and an absolute value of the reference value is less than or equal to a third difference. That the terminal device adjusts the TA timer may include The terminal device restarts the TA timer or increases a maximum timing value of the TA timer. In the foregoing design, when the TA does not expire and the moving distance of the terminal device is relatively short, the terminal device restarts the TA timer or increases the maximum timing value of the TA timer, so that duration of the TA timer can be prolonged. The terminal device prolongs the duration of the TA timer when the moving distance is relatively short, so as to avoid, to some extent, the miss detection in which the terminal device determines the valid TA as invalid when the TA timer expires and the moving distance of the terminal device is relatively short.

In a possible design, the third difference may be less than or equal to the second difference.

In a possible design, the third condition may further include the first parameter is greater than or equal to a threshold, and the threshold is preconfigured by the terminal device or is sent by the network device to the terminal device. Usually, it may be considered that a larger value of the first parameter indicates higher measurement precision. In the foregoing design, the terminal device may adjust the TA timer only when precision of the first parameter is relatively high. In this way, accuracy can be effectively improved.

In a possible design, if a current maximum timing value of the TA timer is greater than or equal to an upper limit value, the terminal device may skip adjusting the TA timer or adjust the maximum timing value of the TA timer to a positive infinity. The upper limit value is preconfigured by the terminal device or is sent by the network device to the terminal device. In the foregoing design, after the maximum timing value of the TA timer reaches the upper limit value, if the moving distance of the terminal device is still very short or the terminal device is even static, the terminal device may adjust the maximum timing value of the TA timer to the positive infinity, so that the TA timer does not need to be adjusted gradually, and overheads can be reduced.

In a possible design, before the terminal device adjusts the TA timer, the terminal device may receive a first indication message sent by the network device, where the first indication message is used to indicate that the terminal device can adjust the TA timer or cannot adjust the TA timer. In the foregoing design, the terminal device may determine, based on an instruction of the network device, that the TA timer can be adjusted.

In a possible design, the terminal device is in an idle mode, and the terminal device may maintain a TA timer in a connected mode to continue timing. Alternatively, the terminal device may maintain a TA timer in a connected mode to continue timing, receive an adjustment value sent by the network device, and adjust a maximum timing value of the TA timer in the connected mode based on the adjustment value. Alternatively, the terminal device may start a new TA timer. In comparison with the conventional technology in which a terminal device deletes a TA timer in a connected mode when entering an idle mode, and consequently, whether a TA is valid cannot be determined based on the TA timer, in the foregoing design, the terminal device in the idle mode may maintain the TA timer in a manner of, for example, maintaining the TA timer in the connected mode to continue timing, so that the terminal device in the idle mode may determine, based on the TA timer, whether the TA is valid, thereby improving accuracy.

In a possible design, if the adjustment value is a positive infinity, after adjusting the maximum timing value of the TA timer in the connected mode to the positive infinity, the terminal device may skip adjusting the TA timer in the connected mode. In the foregoing design, when the maximum timing value of the TA timer is the positive infinity, it may be by default that the terminal device cannot adjust the TA timer anymore.

In a possible design, when determining that the terminal device is in a static state, the terminal device adjusts the maximum timing value of the TA timer to be the positive infinity. In the foregoing design, when determining that the terminal device is in the static state, the terminal device may prolong the duration of the TA timer to the positive infinity, so as to avoid the miss detection in which the terminal device determines the valid TA as invalid when the TA timer expires and the moving distance of the terminal device is relatively short, thereby improving accuracy.

In a possible design, the reference value may be an RSRP obtained by the terminal device through measurement for the serving cell when the terminal device accesses the serving cell. Alternatively, the reference value may be an RSRP obtained by the terminal device through measurement for the serving cell after the terminal device obtains the TA. Alternatively, the reference value may be an RSRP obtained by the terminal device through RSRP measurement previous to current RSRP measurement of the serving cell.

In a possible design, if the reference value may be the RSRP obtained by the terminal device through measurement for the serving cell after the terminal device obtains the TA, the terminal device may measure the RSRP for the serving cell after the terminal device obtains the TA.

In a possible design, that a terminal device obtains a TA may include The terminal device receives a TA sent by the network device when the network device releases the terminal device to enter the idle mode. In comparison with the conventional technology in which a terminal device deletes a TA in a connected mode after entering an idle mode, and consequently, the terminal device in the idle mode has no available TA, in the foregoing design, after entering the idle mode, the terminal device may receive the TA sent by the network device, so that the terminal device in the idle mode can have the TA.

In a possible design, before a terminal device obtains a TA, the method includes before the terminal device enters the connected mode or when the terminal device is in the connected mode, the terminal device receives a TA sent by the network device. Then the terminal device receives second indication information that is sent by the network device when the network device releases the terminal device to enter the idle mode, where the second indication information is used to indicate the terminal device to store a TA in the connected mode when the terminal device is switched from the connected mode to the idle mode. That a terminal device obtains a TA includes The terminal device obtains the stored TA. In comparison with the conventional technology in which a terminal device deletes a TA in a connected mode after entering an idle mode, and consequently, the terminal device in the idle mode has no available TA, in the foregoing design, after entering the idle mode, the terminal device may store the TA in the connected mode, so that the terminal device in the idle mode can have the TA.

In a possible design, the terminal device may send mobility status indication information to the network device, where the mobility status indication information is used to indicate that the terminal device is in a moving state, or the mobility status indication information is used to indicate that the terminal device is in the static state. In the foregoing design, the network device may determine, based on the mobility status indication information sent by the terminal device, whether the terminal device is static, so that the maximum timing value of the TA timer of the terminal device can be adjusted to the positive infinity when the terminal device is static.

In a possible design, when determining that the TA is invalid, the terminal device may further initiate a random access channel procedure (RACH) or an early data transmission (EDT) procedure to the network device. In the foregoing design, the terminal device may obtain a valid TA by using the random access procedure or the early data transmission procedure.

In a possible design, when determining that the TA is invalid, the terminal device may further store configuration information used for uplink data transmission. In the foregoing design, after re-obtaining the valid TA, the terminal device may transmit uplink data by using the stored configuration information.

In a possible design, the terminal device may re-obtain the valid TA, and transmit the uplink data on a preconfigured resource based on the re-obtained TA and the stored configuration information. In the foregoing design, after re-obtaining the valid TA, the terminal device may directly transmit the uplink data by using the stored configuration information, and does not need to re-apply for the configuration information used for uplink transmission, so that signaling overheads can be reduced.

According to a second aspect, an embodiment of this application provides a communication method, including Before a terminal device enters a connected mode or when a terminal device is in a connected mode, a network device sends a TA to the terminal device. The network device sends a TA or indication information to the terminal device when releasing the terminal device to enter an idle mode, where the indication information is used to indicate the terminal device to store a TA in the connected mode when the terminal device is switched from the connected mode to the idle mode. In comparison with the conventional technology in which a terminal device deletes a TA in a connected mode after entering an idle mode, and consequently, the terminal device in the idle mode has no available TA, in this embodiment of this application, after the terminal device enters the idle mode, the network device may send the TA to the terminal device or indicate the terminal device to store the TA in the connected mode, so that the terminal device in the idle mode can have the TA.

In a possible design, the network device sends at least one of the following parameters to the terminal device: an adjustment value, a first difference, a second difference, and a threshold. The adjustment value is used by the terminal device to adjust a maximum timing value of a TA timer based on the adjustment value. The first difference is used to be compared with an absolute value of a difference between a first parameter of the terminal device and a reference value, so that the terminal device determines whether the obtained TA is valid, where the first parameter is information related to a location of the terminal device. The second difference is used to be compared with the absolute value of the difference between the first parameter and the reference value, so that the terminal device determines whether to adjust the TA timer. The threshold is used to be compared with the first parameter, so that the terminal device determines whether to adjust the TA timer.

In a possible design, the adjustment value is used by the terminal device to adjust the maximum timing value of the TA timer when the terminal device is switched to the idle mode, or the adjustment value is used by the terminal device to adjust the maximum timing value of the TA timer when a condition is met.

In a possible design, the adjustment value is a maximum timing value, a multiplicative factor, or an additive factor, where the multiplicative factor may be greater than 1, and the additive factor may be greater than 0. If the adjustment value is the maximum timing value, the adjustment value is used by the terminal device to adjust the maximum timing value of the TA timer to the adjustment value. If the adjustment value is the multiplicative factor, the adjustment value is used by the terminal device to adjust the maximum timing value of the TA timer to a value obtained by multiplying a current maximum timing value of the TA timer by the multiplicative factor. If the adjustment value is the additive factor, the adjustment value is used by the terminal device to adjust the maximum timing value of the TA timer to a value obtained by adding a current maximum timing value of the TA timer and the additive factor.

In a possible design, the adjustment value is a positive infinity.

In a possible design, the network device may skip maintaining the TA timer corresponding to the terminal device. In the foregoing design, for the terminal device in the idle mode, the terminal device maintains the TA timer to perform timing, and the network device may not maintain the TA timer to perform timing. In this way, complexity of the network device can be reduced.

In a possible design, the network device may send an indication message to the terminal device, where the indication message is used to indicate that the terminal device can adjust the TA timer, or the indication message is used to indicate that the terminal device cannot adjust the TA timer. In the foregoing design, the network device may explicitly indicate whether the terminal device can adjust the TA timer.

In a possible design, the network device may receive mobility status indication information sent by the terminal device, where the mobility status indication information is used to indicate the network device that the terminal device is in a static state. If the network device sends a second indication message to the terminal device, the second indication message is used to indicate the terminal device to adjust the maximum timing value of the TA timer to the positive infinity. In the foregoing design, the network device may adjust the maximum timing value of the TA timer of the terminal device in the static state to the positive infinity, so that the TA of the terminal device may be always valid, thereby improving accuracy.

In a possible design, the network device may receive, on a preconfigured resource, uplink data sent by the terminal device, where the uplink data is sent by the terminal device when the TA is valid, or the uplink data is sent by the terminal device after the terminal device determines that the TA is invalid and re-obtains a valid TA.

In a possible design, the network device receives a random access procedure or an early data transmission procedure that is initiated by the terminal device when the terminal device determines that the TA is invalid.

According to a third aspect, an embodiment of this application provides a communication method, including Before a terminal device enters a connected mode or when a terminal device is in a connected mode, a network device sends a TA to the terminal device, and sends at least one of the following parameters to the terminal device: an adjustment value, a first difference, a second difference, and a threshold. The adjustment value is used by the terminal device to adjust a maximum timing value of a TA timer based on the adjustment value. The first difference is used to be compared with an absolute value of a difference between a first parameter of the terminal device and a reference value, so that the terminal device determines whether the obtained TA is valid, where the first parameter is information related to a location of the terminal device. The second difference is used to be compared with the absolute value of the difference between the first parameter and the reference value, so that the terminal device determines whether to adjust the TA timer. The threshold is used to be compared with the first parameter, so that the terminal device determines whether to adjust the TA timer. In this embodiment of this application, the network device may send, to the terminal device in the connected mode, a parameter value used to determine whether the TA is valid and/or used to adjust the TA timer, so that the terminal device in the connected mode may determine, based on the parameter sent by the network device, whether the TA is valid and/or adjust the TA timer. This can improve accuracy of determining, by the terminal device, whether the TA is valid.

In a possible design, the adjustment value is used by the terminal device to adjust the maximum timing value of the TA timer when the terminal device is switched to an idle mode, or the adjustment value is used by the terminal device to adjust the maximum timing value of the TA timer when a condition is met.

In a possible design, the adjustment value is a maximum timing value, a multiplicative factor, or an additive factor, where the multiplicative factor may be greater than 1, and the additive factor may be greater than 0. If the adjustment value is the maximum timing value, the adjustment value is used by the terminal device to adjust the maximum timing value of the TA timer to the adjustment value. If the adjustment value is the multiplicative factor, the adjustment value is used by the terminal device to adjust the maximum timing value of the TA timer to a value obtained by multiplying a current maximum timing value of the TA timer by the multiplicative factor. If the adjustment value is the additive factor, the adjustment value is used by the terminal device to adjust the maximum timing value of the TA timer to a value obtained by adding a current maximum timing value of the TA timer and the additive factor.

In a possible design, the adjustment value is a positive infinity.

In a possible design, the network device may skip maintaining the TA timer corresponding to the terminal device. In the foregoing design, for the terminal device in the idle mode, the terminal device maintains the TA timer to perform timing, and the network device may not maintain the TA timer to perform timing. In this way, complexity of the network device can be reduced.

In a possible design, the network device may send an indication message to the terminal device, where the indication message is used to indicate that the terminal device can adjust the TA timer, or the indication message is used to indicate that the terminal device cannot adjust the TA timer. In the foregoing design, the network device may explicitly indicate whether the terminal device can adjust the TA timer.

In a possible design, the network device may receive mobility status indication information sent by the terminal device, where the mobility status indication information is used to indicate the network device that the terminal device is in a static state. If the network device sends a second indication message to the terminal device, the second indication message is used to indicate the terminal device to adjust the maximum timing value of the TA timer to the positive infinity. In the foregoing design, the network device may adjust the maximum timing value of the TA timer of the terminal device in the static state to the positive infinity, so that the TA of the terminal device may be always valid, thereby improving accuracy.

In a possible design, the network device may receive, on a preconfigured resource, uplink data sent by the terminal device, where the uplink data is sent by the terminal device when the TA is valid, or the uplink data is sent by the terminal device after the terminal device determines that the TA is invalid and re-obtains a valid TA.

In a possible design, the network device receives a random access procedure or an early data transmission procedure that is initiated by the terminal device when the terminal device determines that the TA is invalid.

According to a fourth aspect, this application provides an apparatus. The apparatus may be a terminal device, a network device, or a chip. The apparatus has a function of implementing any one of the embodiments in the first aspect, the second aspect, or the third aspect. The function may be implemented by hardware, or may be implemented by hardware by executing corresponding software. The hardware or the software includes one or more modules corresponding to the foregoing function.

According to a fifth aspect, an apparatus is provided, including a processor, a communications interface, and a memory. The communications interface is configured to transmit information, and/or a message, and/or data between the apparatus and another apparatus. The memory is configured to store a computer-executable instruction. When the apparatus runs, the processor executes the computer-executable instruction stored in the memory, so that the apparatus performs the communication method according to any one of the first aspect or the possible implementations of the first aspect, or the communication method according to any one of the second aspect or the possible implementations of the second aspect, or the communication method according to any one of the third aspect or the possible implementations of the third aspect.

According to a seventh aspect, this application further provides a system. The system includes the terminal device in any one of the embodiments of the first aspect and the network device in any one of the embodiments of the second aspect or the third aspect.

According to an eighth aspect, this application further provides a computer-readable storage medium. The computer-readable storage medium stores an instruction, and when the instruction is run on a computer, the computer is enabled to perform the method according to the foregoing aspects.

According to a ninth aspect, this application further provides a computer program product including an instruction. When the computer program product runs on a computer, the computer is enabled to perform the method according to the foregoing aspects.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
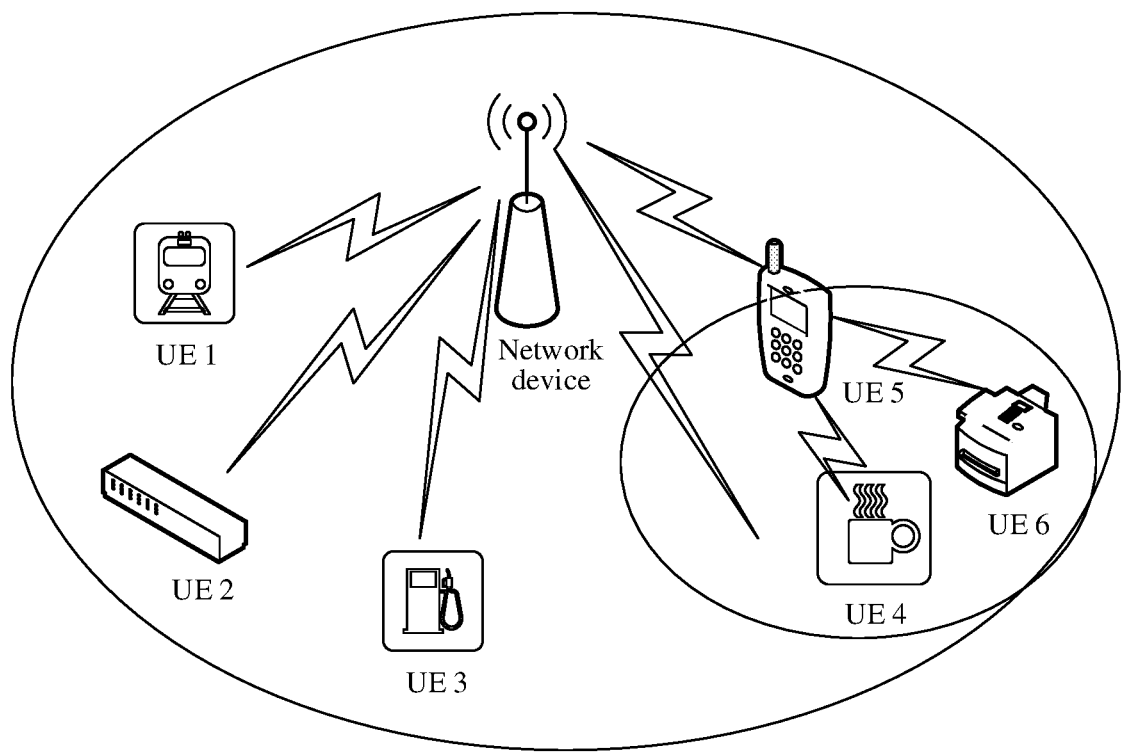
FIG. 1 is a schematic architectural diagram of a communications system according to an embodiment of this application.

The following further describes in detail embodiments of this application with reference to the accompanying drawings.

The communication method provided in this application may be applied to various communications systems, for example, may be internet of things (IoT), narrowband internet of things (NB-IoT), long term evolution (LTE), or may be a fifth generation (5G) communications system, or may be a hybrid architecture of LTE and 5G, or may be a 5G new radio (NR) system, a global system for mobile communications (GSM), a mobile communications system (UMTS), a code division multiple access (CDMA) system, and new communications systems that emerges in future communication development. The communication method provided in the embodiments of this application may be used provided that one entity in a communications system needs to send transmission direction indication information, and the other entity needs to receive the indication information, and determine a transmission direction within a specific time period based on the indication information.

A terminal device in the embodiments of this application is a device, for example, a handheld device, a vehicle-mounted device, or the like that has a wireless connection function, that provides voice and/or data connectivity for a user. The terminal device may alternatively be another processing device connected to a wireless modem. The terminal device may communicate with one or more core networks through a radio access network (RAN). The terminal device may also be referred to as a wireless terminal, a subscriber unit, a subscriber station, a mobile station, a mobile, a remote station, an access point, a remote terminal, an access terminal, a user terminal, a user agent, a user device, user equipment (UE), or the like. The terminal device may be a mobile terminal, for example, a mobile phone (or referred to as a "cellular" phone), and a computer that has a mobile terminal. For example, the terminal device may be a portable, pocket-size, handheld, computer built-in, or in-vehicle mobile apparatus, which exchanges voice and/or data with the radio access network. For example, the terminal device may alternatively be a device such as a personal communications service (PCS) phone, a cordless phone, a session initiation protocol (SIP) phone, a wireless local loop (WLL) station, or a personal digital assistant (PDA). A common terminal device includes, for example, a mobile phone, a tablet, a notebook computer, a palmtop computer, a mobile internet device (MID), and a wearable device such as a smartwatch, a smart band, or a pedometer. However, the embodiments of this application are not limited thereto.

A network device in the embodiments of this application may be configured to mutually convert a received over-the-air frame and an internet protocol (IP) packet and serve as a router between the terminal device and a remaining part of the access network. The remaining part of the access network may include an IP network and the like. The network device may further coordinate attribute management of the air interface. For example, the network device may be a base transceiver station (BTS) in a global system for mobile communications (GSM) or code division multiple access (CDMA), or may be a NodeB (NodeB) in wideband code division multiple access (WCDMA), or may be an evolved NodeB (evolutional Node B, eNB or e-NodeB) in LTE, or may be a new radio controller (NR controller), or may be a gNode B (gNB) in a 5G system, or may be a central unit (centralized unit), or may be a new radio base station, may be a remote radio unit, may be a micro base station, may be a relay (relay), may be a distributed unit, may be a transmission reception point (TRP) or a transmission point (TP), or may be any other radio access device. However, the embodiments of this application are not limited thereto. The network device may cover one or more cells.

FIG. 1 shows a communications system according to an embodiment of this application. The communications system includes a network device and six terminal devices, that is, UE 1 to UE 6. In the communications system, the UE 1 to the UE 6 may send uplink data to the network device, and the network device may receive the uplink data sent by the UE 1 to the UE 6. In addition, the UE 4 to the UE 6 may also constitute a sub-communications system. The network device may send downlink information to the UE 1, the UE 2, the UE 3, and the UE 5, and the UE 5 may send the downlink information to the UE 4 and the UE 6 based on a device-to-device (D2D) technology. FIG. 1 is merely a schematic diagram, and a type of a communications system, a quantity of devices included in the communications system, a type of a device included in the communications system, and the like are not specifically limited.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

Usually, when a terminal device needs to transmit uplink data, the terminal device first applies to the network device for an uplink transmission resource. The network device sends uplink transmission scheduling information to the terminal device. The terminal device performs uplink transmission based on the uplink transmission scheduling information. In NB-IoT Release 16, uplink transmission in preconfigured resources (grant-free transmission or UL transmission in preconfigured resources) is studied. A specific process is as follows: When a terminal device needs to transmit uplink data, the terminal device directly performs uplink transmission on a preconfigured resource in a pre-specified sending manner.

In a communications system, a terminal device may be in two modes: an idle mode and a connected mode. Idle mode: The terminal device is in a sleep state, and periodically wakes up to listen to paging. If the terminal device obtains paging by listening, or the terminal device has uplink data to be sent, the terminal device wakes up to initiate random access to enter the connected mode, and sends the uplink data or receives downlink data in the connected mode. Connected mode: The terminal device has woken up from the sleep state, has established a connection to the network device, and may send the uplink data or receive the downlink data. The uplink transmission in preconfigured resources studied in the NB-IoT Release 16 may be applied to a terminal device in the connected mode, or may be applied to a terminal device in the idle mode. When performing the uplink transmission in preconfigured resources, the terminal device in the idle mode may not send a random access procedure to the network device, but may directly perform the uplink transmission in preconfigured resources.

In a same cell, locations of different terminal devices are different, and times at which uplink data sent by the terminal devices arrives at the network device may be different. This causes interference between users. Therefore, when performing the uplink transmission in preconfigured resources, the terminal device needs to use a valid timing advance (TA), so that data sent by the terminal devices during uplink transmission in preconfigured resources can simultaneously arrive at the network device, to avoid interference between the terminal devices.

In NB-IoT, for the terminal device in the connected mode, the network device may estimate an uplink timing of the terminal device, and send a TA to the terminal device based on the estimated uplink timing. The terminal device adjusts an uplink transmission time based on the TA, so that uplink data sent by all terminal devices in the cell arrives at the network device at a same time. After sending the TA to the terminal device, the network device starts a TA timer. After receiving the TA, the terminal device also starts the same TA timer. Both the network device and the terminal device maintain the TA timer to perform timing. In this way, whether the TA is valid may be determined depending on whether the TA timer expires. If the TA timer does not expire, the TA is considered valid. If the TA timer expires, the TA is considered invalid. If quality of a signal received by the network device from the terminal device is poor when the TA timer does not expire, or if the TA timer expires, the network device may actively trigger, by sending a physical downlink control channel (PDCCH) order message to the terminal device, the terminal device to update the TA. After receiving the PDCCH order message, the terminal device sends a specified preamble sequence based on indication information in the PDCCH order. The network device re-estimates a TA by detecting the preamble, and sends the TA to the terminal device. After receiving the new TA, the terminal device performs uplink transmission by using the new TA, and restarts the TA timer.

However, in the current communications system, the foregoing TA, the TA timer, and the PDCCH order message are all for UE in the connected mode. After the terminal device in the connected mode is switched to the idle mode, the terminal device deletes the TA and the TA timer, and the network device cannot send the PDCCH order message to the terminal device that is in the idle mode to trigger the terminal device in the idle mode to update the TA. Consequently, the terminal device in the idle mode cannot determine a valid TA, and the terminal device in the idle mode may fail to perform the uplink transmission in preconfigured resources.

A conventional idea for resolving this problem is as follows. The terminal device in the idle mode may refer to the terminal device in the connected mode. That is, the terminal device in the idle mode is required to reserve a TA in the connected mode, and one TA timer is introduced. The terminal device in the idle mode determines, depending on whether the TA timer expires, whether the TA is valid. If the TA timer does not expire, the TA is considered valid. If the TA timer expires, the TA is considered invalid.

The terminal device determines, based on the reserved TA timer, whether the TA is valid. Consequently, cases of a false alarm and a miss detection may easily occur. For example, a case of false alarm is as follows. The TA timer does not expire, but the terminal device moves a relatively long distance. The terminal device determines, based on the TA timer, that the reserved TA is valid. However, actually the TA is invalid. For another example, a case of miss detection is as follows. The TA timer has expired, but the terminal device is static. The terminal device determines, based on the TA timer, that the reserved TA is invalid. However, because the terminal device is actually static, the previously reserved TA can still be used. That is, the TA is still valid. It can be learned that currently, a TA of UE in an uplink transmission in preconfigured resources is not accurate.

On this basis, the embodiments of this application provide a communication method and a device, to resolve a prior-art problem that the TA of the UE in the uplink transmission in preconfigured resources is not accurate. The method and apparatus are based on a same inventive concept. Because a problem-resolving principle of the device is similar to that of the method, mutual reference may be made to implementations of the method and the apparatus, and repeated description is not provided.

"A plurality of" in the embodiments of this application refers to two or more than two.

"A TA is considered valid" or "a TA is valid" in the embodiments of this application may be understood as that the TA is accurate. To be specific, it can be ensured that a time at which uplink data sent by the terminal device by using the TA arrives at the network device may be the same as a time at which uplink data sent by another terminal device arrives at the network device, so that there is no interference between users.

"A TA is considered invalid" or "a TA is invalid" in the embodiments of this application may be understood as that the TA is inaccurate, and a time at which uplink data sent by the terminal device by using the TA arrives at the network device is different from a time at which uplink data sent by another terminal device arrives at the network device. This may cause interference between users.

In addition, it should be understood that in the descriptions of this application, terms such as "first" and "second" are merely used for distinguishing and description, but should not be understood as an indication or implication of relative importance, or should not be understood as an indication or implication of a sequence.

Figure 2:
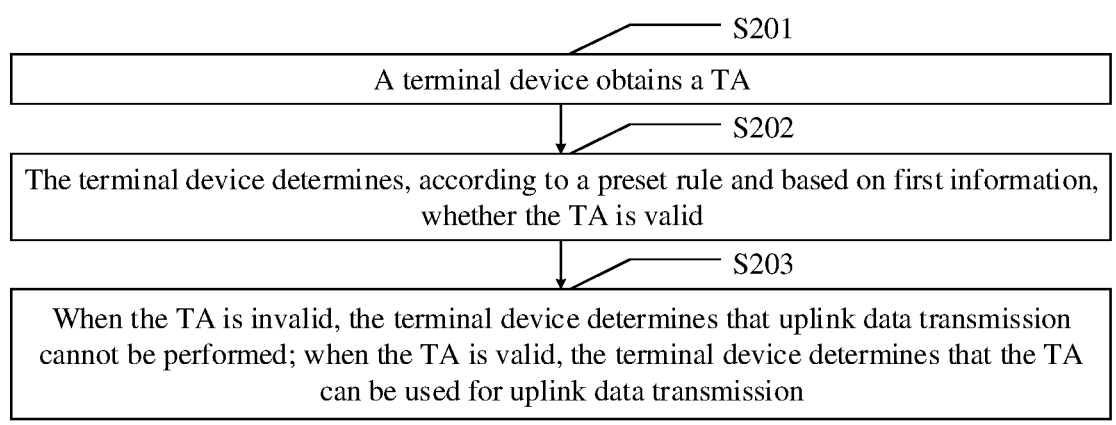
FIG. 2 is a schematic flowchart of a communication method according to an embodiment of this application.

FIG. 2 is a flowchart of a communication method according to this application. The method may be applied to the communications system shown in FIG. 1, and the method includes the following steps.

S201. A terminal device obtains a TA. For example, the terminal device may obtain the TA in, but not limited to, any one of the following four manners.

Manner 1: A network device may send the TA to a terminal device in a connected mode. The network device may send the TA to the terminal device in a random access procedure of the terminal device, or the network device may send the TA to the terminal device when triggering, by using a PDCCH order message, the terminal device to update the TA. Therefore, if the terminal device is in the connected mode, the terminal device may obtain the TA when receiving the TA sent by the network device.

Manner 2: Before the terminal device enters a connected mode or when the terminal device is in a connected mode, a network device sends the TA to the terminal device. The network device may send a first indication message to the terminal device before the terminal device enters an idle mode, to indicate the terminal device to store the TA in the connected mode when the terminal device enters the idle mode. The first indication message may be carried in a release message that is sent by the network device to the terminal device when the network device releases an RRC connection of the terminal device. Therefore, if the terminal device is in the idle mode, the terminal device may receive, before entering the connected mode or when entering the connected mode, the TA sent by the network device, and receive the first indication message sent by the network device. The terminal device stores the TA in the connected mode when the terminal device is switched from the connected mode to the idle mode.

Manner 3: Before the terminal device enters a connected mode or when the terminal device is in a connected mode, a network device sends the TA to the terminal device. Therefore, if the terminal device is in an idle mode, the terminal device may receive, before entering the connected mode or when entering the connected mode, the TA sent by the network device, and may directly store the TA in the connected mode when the terminal device is switched from the connected mode to the idle mode.

Manner 4: If the terminal device is in an idle mode, a network device may send the TA to the terminal device in the idle mode. The TA may be carried in a release message that is sent by the network device to the terminal device when the network device releases an RRC connection of the terminal device. Therefore, the terminal device in the idle mode may obtain the TA when receiving the TA sent by the network device.

S202. The terminal device determines, according to a preset rule and first information, whether the TA is valid, where the first information includes a first parameter, and the first parameter is information related to a location of the terminal device.

Before determining, according to the preset rule and the first information, whether the TA is valid, the terminal device may measure a current reference signal received power (reference signal received power, RSRP) of a serving cell. Therefore, the first parameter may be the RSRP that is of the serving cell and that is obtained by the terminal device through measurement. Specifically, before determining, according to the preset rule and the first information, whether the TA is valid, the terminal device may receive a reference signal sent by the network device, and then measure the RSRP of the serving cell based on the reference signal. Because the RSRP may indicate signal quality that is of the serving cell and that is obtained by the terminal device through measurement, a larger RSRP usually indicates a better signal, in other words, indicates a shorter distance between the terminal device and the network device. The RSRP can reflect a distance between the terminal device and the network device to some extent. A relatively great change of the RSRP indicates a relatively long moving distance of the terminal device. A relatively small change of the RSRP indicates a relatively short moving distance of the terminal device. Therefore, when whether the TA is accurate is determined based on the RSRP, accuracy is relatively high.

Certainly, the first parameter may alternatively be other information related to the location of the terminal device, for example, location information obtained by the terminal device through measurement by using a global positioning system (global positioning system, GPS) technology. The first parameter is not specifically limited herein in the embodiments of this application. For ease of description, that the first parameter is the RSRP that is of the serving cell and that is obtained by the terminal device through measurement is used as an example to describe this embodiment of this application.

Optionally, the terminal device may perform step S202 when the terminal device needs to send uplink data to the network device. Alternatively, the terminal device may perform step S202 when the terminal device needs to send uplink data to the network device on a preconfigured resource. Certainly, the terminal device may alternatively perform step S202 in another case when valid TA is required. An execution time for the terminal device to determine whether the TA is valid is not specifically limited in this embodiment of this application.

S203. When the TA is invalid, the terminal device determines that uplink data transmission cannot be performed. When the TA is valid, the terminal device determines that the TA can be used for uplink data transmission.

Further, when the TA is invalid, the terminal device may further initiate a random access procedure or an early data transmission procedure to the network device.

In an implementation, when the TA is invalid, the terminal device may enter an inactive state. To be specific, a configuration of uplink transmission in preconfigured resources of the terminal device is in the inactive state. In the inactive state, the terminal device may reserve the configuration of the uplink transmission in preconfigured resources, but cannot perform the uplink transmission in preconfigured resources. After re-obtaining a valid TA, the terminal device may continue to perform the uplink transmission in preconfigured resources by using the configuration of the uplink transmission in preconfigured resources. If the terminal device cannot use the uplink transmission in preconfigured resources only because the TA obtained by the terminal device is invalid, after the terminal device obtains the valid TA, the previous configuration of the uplink transmission in preconfigured resources can be used theoretically. In the foregoing manner, the terminal device reserves the configuration of the uplink transmission in preconfigured resources when the obtained TA is an invalid TA. In this way, after re-obtaining the valid TA, the terminal device may directly use the previously reserved configuration of the uplink transmission in preconfigured resources to perform the uplink transmission in preconfigured resources, so as to reduce signaling overheads of re-obtaining the configuration of the uplink transmission in preconfigured resources.

In this embodiment of this application, the terminal device determines, based on the information related to the location of the terminal device, whether the TA is valid, so as to avoid, to some extent, a case of false alarm in which the terminal device determines an invalid TA as valid when a TA timer does not expire but a moving distance of the terminal device is excessively long. This can also avoid, to some extent, a case of miss detection in which the terminal device determines a valid TA as invalid when the TA timer expires but the moving distance of the terminal device is very short, thereby improving accuracy of determining, by the terminal device, whether the TA is valid.

In a possible implementation, the terminal device may determine, according to the preset rule and the first information, whether the TA is valid in the following manner.

If an absolute value of a difference between the current RSRP that is of the serving cell and that is obtained by the terminal device through measurement and a reference value of the RSRP is greater than or equal to a first difference, that is, the current RSRP that is of the serving cell and that is obtained by the terminal device through measurement satisfies $|R-R'| \geq \Delta R_1$, the terminal device determines that the TA is invalid. R is the current RSRP that is of the serving cell and that is obtained by the terminal device through measurement, R' is the reference value of the RSRP, and $\Delta R_1$ is the first difference. If an absolute value of a difference between the current RSRP that is of the serving cell and that is obtained by the terminal device through measurement and a reference value of the RSRP is less than the first difference, that is, the current RSRP that is of the serving cell and that is obtained by the terminal device through measurement satisfies $|R-R'| < \Delta R_1$, the terminal device determines that the TA is valid.

The first difference may be preconfigured by the terminal device, or may be sent by the network device to the terminal device when the network device releases the RRC connection of the terminal device. Further, the first difference may be carried in the release message that is sent by the network device to the terminal device when the network device releases the RRC connection of the terminal device.

The reference value of the RSRP in this embodiment of this application may be obtained in any one of the following manners. The network device may send a reference signal to the terminal device when the terminal device accesses the serving cell, and the terminal device may receive, when accessing the serving cell, the reference signal sent by the network device, so that the RSRP can be measured for the serving cell based on the reference signal. Therefore, the reference value of the RSRP may be an RSRP obtained by the terminal device through measurement for the serving cell when the terminal device accesses the serving cell. Alternatively, the network device may send a reference signal to the terminal device at least once before the terminal device obtains the TA, and the terminal device may receive, before obtaining the TA, the reference signal sent by the network device, so that the terminal device may perform at least one RSRP measurement on the serving cell based on the reference signal. Therefore, the reference value of the RSRP may be an RSRP obtained by the terminal device through the last measurement for the serving cell before the terminal device obtains the TA. Alternatively, the network device may send a reference signal to the terminal device after the terminal device obtains the TA, and the terminal device may receive, after obtaining the TA, the reference signal sent by the network device, so that RSRP measurement can be performed on the serving cell based on the reference signal. Therefore, the reference value of the RSRP may be an RSRP obtained by the terminal device through measurement for the serving cell after the terminal device obtains the TA. Alternatively, after accessing the serving cell, the terminal device performs at least two pieces of RSRP measurement on the serving cell. Therefore, the reference value of the RSRP may be an RSRP obtained by the terminal device through RSRP measurement previous to current RSRP measurement of the serving cell.

In another possible implementation, the terminal device may determine, according to the preset rule and the first information, whether the TA is valid in the following manner.

If an absolute value of a difference between the current RSRP that is of the serving cell and that is obtained by the terminal device through measurement and a reference value of the RSRP is greater than a first difference, that is, the current RSRP that is of the serving cell and that is obtained by the terminal device through measurement satisfies $|R-R'| > \Delta R_1$, the terminal device determines that the TA is invalid. If an absolute value of a difference between the current RSRP that is of the serving cell and that is obtained by the terminal device through measurement and a reference value of the RSRP is less than or equal to the first difference, that is, the current RSRP that is of the serving cell and that is obtained by the terminal device through measurement satisfies $|R-R'| \leq \Delta R_1$, the terminal device determines that the TA is valid.

The first information may further include information about a TA timer, and the information about the TA timer may indicate whether the TA timer expires.

A TA timer of the terminal device in the idle mode may be obtained in any one of the following three manners.

Manner 1: The terminal device in the idle mode may maintain a TA timer in the connected mode to continue timing. In other words, the TA timer in the connected mode may continue to be used as the TA timer of the terminal device in the idle mode.

Manner 2: The terminal device in the idle mode may further start a new TA timer, where the new TA timer may be used as the TA timer of the terminal device in the idle mode. A maximum timing value of the new TA timer may be equal to a maximum timing value of a TA timer in the connected mode, or a maximum timing value of the new TA timer may be greater than a maximum timing value of a TA timer in the connected mode. Certainly, a maximum timing value of the new TA timer may alternatively be less than a maximum timing value of a TA timer in the connected mode.

Manner 3: When entering the idle mode, the terminal device in the idle mode may alternatively adjust a maximum timing value of a TA timer in the connected mode based on a first adjustment value, and maintain the TA timer in the connected mode to continue timing. The first adjustment value may be preconfigured by the terminal device, or may be sent by the network device to the terminal device. Further, the first adjustment value may be carried in the release message that is sent by the network device to the terminal device when the network device releases the RRC connection of the terminal device. The first adjustment value may be a maximum timing value, or may be a multiplicative factor, or may be an additive factor, where the multiplicative factor may be greater than 1, and the additive factor may be greater than 0.

When the terminal device in the idle mode adjusts the maximum timing value of the TA timer in the connected mode based on the first adjustment value, if the first adjustment value is the maximum timing value, the terminal device may adjust the maximum timing value of the TA timer to the first adjustment value. For example, the first adjustment value is 40.96s. It is assumed that the maximum timing value of the TA timer in the connected mode is 10.24s. When entering the idle mode, the terminal device may maintain the TA timer in the connected mode to continue timing, and change the maximum timing value of the TA timer in the connected mode to 40.96s. If the first adjustment value is the multiplicative factor, the terminal device may adjust the maximum timing value of the TA timer to a value obtained by multiplying a current maximum timing value of the TA timer by the multiplicative factor. For example, the first adjustment value is 4. It is assumed that the maximum timing value of the TA timer in the connected mode is 10.24s. When entering the idle mode, the terminal device may maintain the TA timer in the connected mode to continue timing, and change the maximum timing value of the TA timer in the connected mode to 10.24s×4=40.96s. If the first adjustment value is the additive factor, the terminal device may adjust the maximum timing value of the TA timer to a value obtained by adding a current maximum timing value of the TA timer and the additive factor. For example, the first adjustment value is 5. It is assumed that the maximum timing value of the TA timer in the connected mode is 10.24s. When entering the idle mode, the terminal device may maintain the TA timer in the connected mode to continue timing, and change the maximum timing value of the TA timer in the connected mode to 10.24s+5=15.24s.

Optionally, for the terminal device in the idle mode, the terminal device may maintain the TA timer to perform timing alone, and the network device may not maintain the TA timer to perform timing. In this way, complexity of an eNB can be reduced.

The TA timer of the terminal device in the connected mode may be a TA timer started when a TA sent by the network device is received.

The terminal device may determine, according to the preset rule and the first information, whether the TA is valid in the following manner.

If the first information meets a first condition, the terminal device determines that the obtained TA is valid. If the first information does not meet the first condition, the terminal device determines that the obtained TA is invalid. The first condition may be that the TA timer does not expire, and the absolute value of the difference between the current RSRP that is of the serving cell and that is obtained by the terminal device through measurement and the reference value of the RSRP is less than or equal to a second difference, that is, the current RSRP that is of the serving cell and that is obtained by the terminal device through measurement satisfies $|R-R'| \leq \Delta R_2$, where $\Delta R_2$ is the second difference.

Alternatively, if the first information meets a second condition, the terminal device determines that the TA is valid. If the first information does not meet the second condition, the terminal device determines that the TA is invalid. The second condition may be that the TA timer does not expire, and the absolute value of the difference between the current RSRP that is of the serving cell and that is obtained by the terminal device through measurement and the reference value of the RSRP is less than the second difference, that is, the current RSRP that is of the serving cell and that is obtained by the terminal device through measurement satisfies $|R-R'| < \Delta R_2$.

The second difference may be preconfigured by the terminal device, or may be sent by the network device to the terminal device when the network device releases the RRC connection of the terminal device. Further, the second difference may be carried in the release message that is sent by the network device to the terminal device when the network device releases the RRC connection of the terminal device.

In a possible implementation, the network device may send a second indication message to the terminal device, where the second indication message is used to indicate that the terminal device can adjust the TA timer, or the second indication message is used to indicate that the terminal device cannot adjust the TA timer. The second indication message may be carried in the release message that is sent by the network device to the terminal device when the network device releases the RRC connection of the terminal device. Alternatively, the network device may send the second indication message at any moment before the terminal device adjusts the TA timer. Therefore, after receiving the second indication message used to indicate that the terminal device can adjust the TA timer, the terminal device determines that the TA timer can be adjusted. After receiving the second indication message used to indicate that the terminal device cannot adjust the TA timer, the terminal device determines that the TA timer cannot be adjusted.

In another possible implementation, the network device may alternatively not send the second indication message to the terminal device. It may be by default that the terminal device can adjust the TA timer, or it may be by default that the terminal device cannot adjust the TA timer.

In another possible implementation, when determining that the current maximum timing value of the TA timer is a positive infinity, it may be by default that the terminal device cannot adjust the TA timer anymore.

Figure 3:
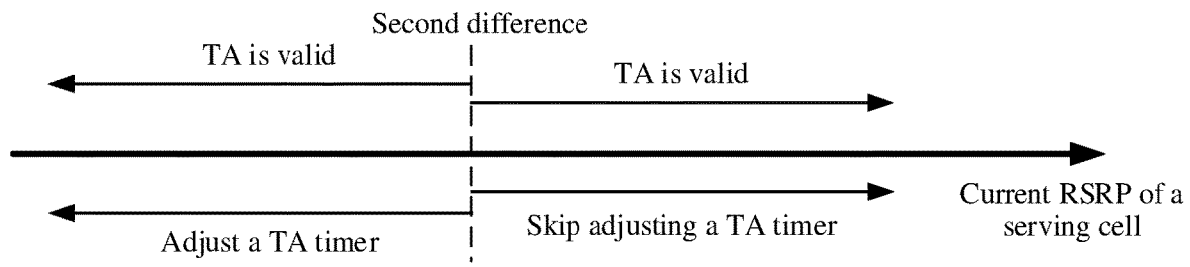
FIG. 3 is a schematic diagram of adjusting a TA timer according to an embodiment of this application.
Figure 4:
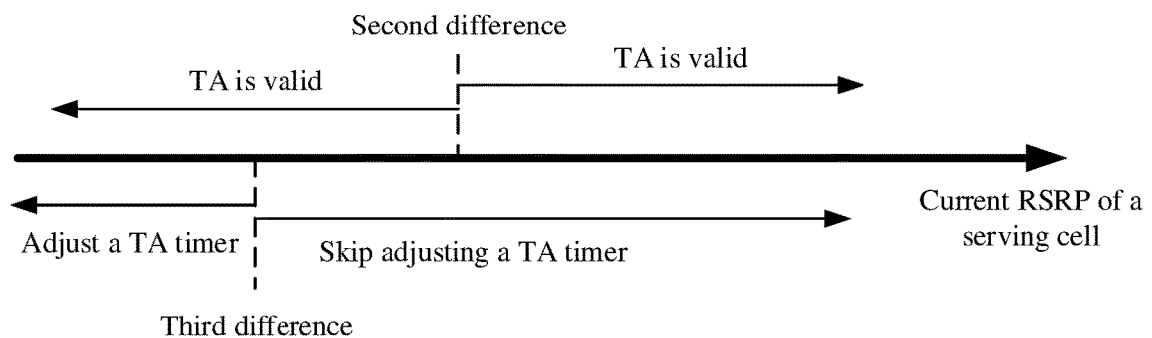
FIG. 4 is another schematic diagram of adjusting a TA timer according to an embodiment of this application.

If the terminal device can adjust the TA timer, the terminal device may adjust the TA timer when the first information meets a third condition. The third condition may be that the TA timer does not expire, and the absolute value of the difference between the current RSRP that is of the serving cell and that is obtained by the terminal device through measurement and an absolute value of the reference value of the RSRP is less than or equal to a third difference, that is, the current RSRP that is of the serving cell and that is obtained by the terminal device through measurement satisfies $|R-R'| \leq \Delta R_3$. Alternatively, the third condition may be that the TA timer does not expire, and the absolute value of the difference between the current RSRP that is of the serving cell and that is obtained by the terminal device through measurement and an absolute value of the reference value of the RSRP is less than a third difference, that is, the current RSRP that is of the serving cell and that is obtained by the terminal device through measurement satisfies $|R-R'| < \Delta R_3$. The third difference herein may be less than or equal to the second difference. If the third difference is equal to the second difference, the third condition may be shown in FIG. 3. If the third difference is less than the second difference, the third condition may be shown in FIG. 4.

The third condition may further include the current RSRP that is of the serving cell and that is obtained by the terminal device through measurement is greater than or equal to a threshold. Alternatively, the third condition may further include the current RSRP that is of the serving cell and that is obtained by the terminal device through measurement is greater than a threshold. The threshold may be preconfigured by the terminal device, or may be sent by the network device to the terminal device when the network device releases the RRC connection of the terminal device. Further, the threshold may be carried in the release message that is sent by the network device to the terminal device when the network device releases the RRC connection of the terminal device. Usually, it may be considered that a larger value of the first parameter indicates higher measurement precision. Therefore, only when the current RSRP that is of the serving cell and that is obtained by the terminal device through measurement is greater than the threshold, that is, precision of the terminal device is relatively high, the terminal device can adjust the TA timer. This can better ensure accuracy of determining whether the TA is valid.

Specifically, the terminal device may adjust the TA timer by restarting the TA timer. Alternatively, the terminal device may adjust the TA timer by increasing the maximum timing value of the TA timer.

Further, when adjusting the TA timer by increasing the maximum timing value of the TA timer, the terminal device may specifically increase the maximum timing value of the TA timer based on a second adjustment value. The second adjustment value may be the maximum timing value, or may be a multiplicative factor, or may be an additive factor, where the multiplicative factor may be greater than 1, and the additive factor may be greater than 0. The second adjustment value may be preconfigured by the terminal device, or may be sent by the network device to the terminal device when the network device releases the RRC connection of the terminal device. Further, the second adjustment value may be carried in the release message that is sent by the network device to the terminal device when the network device releases the RRC connection of the terminal device. Alternatively, if the terminal device determines, based on an instruction of the second indication message, that the TA timer can be adjusted, the second adjustment value may also be carried in the second indication message.

When the terminal device increases the maximum timing value of the TA timer based on the second adjustment value, if the second adjustment value is the maximum timing value, the terminal device may adjust the maximum timing value of the TA timer to the second adjustment value. For example, the second adjustment value is 40.96s. It is assumed that the maximum timing value of the TA timer in the connected mode is 10.24s. When the first information meets the third condition, the terminal device may adjust the maximum timing value of the TA timer to 40.96s. When the terminal device increases the maximum timing value of the TA timer based on the second adjustment value, if the second adjustment value is the multiplicative factor, the terminal device adjusts the maximum timing value of the TA timer to a value obtained by multiplying a current maximum timing value of the TA timer by the multiplicative factor. For example, the second adjustment value is 4. It is assumed that the maximum timing value of the TA timer in the connected mode is 10.24s. When the first information meets the third condition, the terminal device may change the maximum timing value of the TA timer to 10.24s×4=40.96s. When the terminal device increases the maximum timing value of the TA timer based on the second adjustment value, if the second adjustment value is the additive factor, the terminal device adjusts the maximum timing value of the TA timer to a value obtained by adding a current maximum timing value of the TA timer and the additive factor. For example, the second adjustment value is 5. It is assumed that the maximum timing value of the TA timer in the connected mode is 10.24s. When the first information meets the third condition, the terminal device may change the maximum timing value of the TA timer to 10.24s+5=15.24s.

Optionally, if the current maximum timing value of the TA timer is greater than or equal to an upper limit value, the terminal device may skip adjusting the TA timer, or may adjust the maximum timing value of the TA timer to a positive infinity. The upper limit value may be preconfigured by the terminal device, or may be sent by the network device to the terminal device when the network device releases the RRC connection of the terminal device. Further, the upper limit may be carried in the release message that is sent by the network device to the terminal device when the network device releases the RRC connection of the terminal device. Alternatively, if the terminal device determines, based on an instruction of the second indication message, that the TA timer can be adjusted, the upper limit value may also be carried in the second indication message. In this embodiment of this application, after the terminal device adjusts the maximum timing value of the TA timer to the upper limit value, if the terminal device determines that the terminal device moves very slow or the terminal device is in a static state, the terminal device may directly adjust the maximum timing value of the TA timer to the positive infinity. In this way, the maximum timing value of the TA timer does not need to be gradually increased, so that overheads can be reduced.

In an implementation, the terminal device may send mobility status indication information to the network device, where the mobility status indication information is used to indicate that the terminal device is in a moving state, or the mobility status indication information is used to indicate that the terminal device is in the static state. Therefore, after receiving the moving state indication information used to indicate that the terminal device is in the static state, the network device may adjust the maximum timing value of the TA timer of the terminal device to the positive infinity. Specifically, the network device may send a first adjustment value of the positive infinity to the terminal device, so that the terminal device adjusts the maximum timing value of the TA timer to the positive infinity after receiving the first adjustment value.

Optionally, when determining that the terminal device is in the static state, the terminal device may directly adjust the maximum timing value of the TA timer to the positive infinity.

Figure 5:
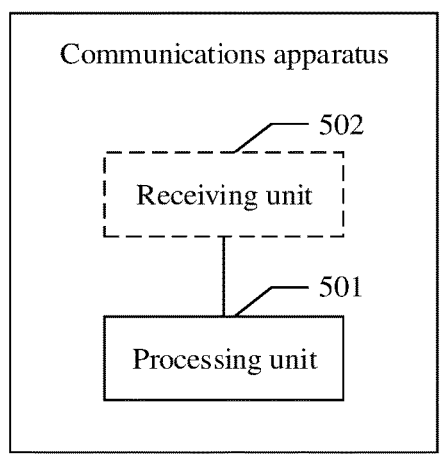
FIG. 5 is a schematic diagram of a structure of a terminal device according to an embodiment of this application.

Based on a same inventive concept as the method embodiment, an embodiment of this application provides a communications apparatus, specifically configured to implement the method described in the embodiment in FIG. 2. The device may be the communications apparatus, or may be a chip, a chipset, or a part of the chip in the communications apparatus, and the part of the chip is configured to perform a related method function. A structure of the communications apparatus may be shown in FIG. 5. The communications apparatus includes a processing unit 501, and may further include a receiving unit 502. The processing unit 501 is configured to obtain a timing advance TA, determine, according to a preset rule and first information, whether the TA is a valid TA, where the first information includes a first parameter, and the first parameter is information related to a location of the apparatus, and when the TA is invalid, determine that uplink data transmission cannot be performed on a preconfigured resource, or when the TA is valid, determine that the TA can be used for uplink data transmission.

The processing unit 501 may be further configured to before determining, according to the preset rule and the first information, whether the TA is valid, measure a current reference signal received power RSRP of a serving cell via the receiving unit 502, where the first parameter is the current RSRP that is of the serving cell and that is obtained by the apparatus through measurement. Specifically, the receiving unit 502 may be configured to receive a reference signal sent by the network device. The processing unit 501 may specifically measure the current reference signal received power RSRP of the serving cell based on the reference signal received by the receiving unit 502.

When determining, according to the preset rule and the first information, whether the TA is valid, the processing unit 501 may be specifically configured to if an absolute value of a difference between the first parameter and a reference value is greater than or equal to a first difference, determine that the TA is invalid, or if an absolute value of a difference between the first parameter and the reference value is less than the first difference, determine that the TA is valid.

Alternatively, when determining, according to the preset rule and the first information, whether the TA is valid, the processing unit 501 may be specifically configured to if an absolute value of a difference between the first parameter and the reference value is greater than a first difference, determine that the TA is invalid, or if an absolute value of a difference between the first parameter and the reference value is less than or equal to the first difference, determine that the TA is valid.

The first difference is preconfigured by the communications apparatus or is sent by the network device to the communications apparatus.

The first information may further include information about a TA timer. When determining, according to the preset rule and the first information, whether the TA is valid, the processing unit 501 may be specifically configured to if the first information meets a first condition, determine that the TA is valid, where the first condition is that the TA timer does not expire, an absolute value of a difference between the first parameter and a reference value is less than or equal to a second difference, and the second difference is preconfigured by the communications apparatus or is sent by the network device to the communications apparatus, or if the first information does not meet the first condition, determine that the TA is invalid.

Alternatively, when determining, according to the preset rule and the first information, whether the TA is valid, the processing unit 501 may be specifically configured to if the first information meets a second condition, determine that the TA is valid, where the second condition is that the TA timer does not expire, and an absolute value of a difference between the first parameter and the reference value is less than the second difference, or if the first information does not meet the second condition, determine that the TA is invalid.

The processing unit 501 may be further configured to if the first information meets a third condition, adjust the TA timer, where the third condition includes that the TA timer does not expire, and an absolute value of a difference between the first parameter and an absolute value of the reference value is less than or equal to a third difference.

When adjusting the TA timer, the processing unit 501 may be specifically configured to restart the TA timer or increase a maximum timing value of the TA timer.

For example, the third difference is less than or equal to the second difference.

The third condition may further include the first parameter is greater than or equal to a threshold, and the threshold is preconfigured by the communications apparatus or is sent by the network device to the communications apparatus.

If the communications apparatus is in an idle mode, the processing unit 501 may be further configured to maintain a TA timer in a connected mode to continue timing.

Alternatively, if the communications apparatus is in an idle mode, the processing unit 501 may be further configured to maintain a TA timer in a connected mode to continue timing. The receiving unit 502 may be further configured to receive an adjustment value sent by the network device. The processing unit 501 may be further configured to adjust a maximum timing value of the TA timer in the connected mode based on the adjustment value.

Alternatively, if the communications apparatus is in an idle mode, the processing unit 501 may be further configured to start a new TA timer.

When adjusting the maximum timing value of the TA timer in the connected mode based on the adjustment value, the processing unit 501 may be specifically configured to if the adjustment value is a positive infinity, after adjusting the maximum timing value of the TA timer in the connected mode to the positive infinity, skip adjusting the TA timer in the connected mode.

The processing unit 501 may be further configured to when determining that the processing unit 501 is in a static state, adjust the maximum timing value of the TA timer to the positive infinity.

For example, the reference value is an RSRP obtained by the apparatus through measurement for the serving cell when the apparatus accesses the serving cell. Alternatively, the reference value is an RSRP obtained by the apparatus through measurement for the serving cell after the apparatus obtains the TA. Alternatively, the reference value is an RSRP obtained by the apparatus through RSRP measurement previous to current RSRP measurement of the serving cell.

When the processing unit 501 is configured to obtain the TA, the processing unit 501 may be specifically configured to receive, via the receiving unit 502, a TA sent by the network device when the network device releases the apparatus to enter the idle mode.

Alternatively, the receiving unit 502 may be further configured to before the apparatus enters a connected mode or when the apparatus is in a connected mode, receive a TA sent by the network device, and receive indication information sent by the network device when the network releases the apparatus to enter the idle mode, where the indication information is used to indicate the apparatus to store a TA in the connected mode when the apparatus is switched from the connected mode to the idle mode. When obtaining the TA, the processing unit 501 may be specifically configured to obtain the stored TA.

Division into modules in this embodiment of this application is an example, and is merely a logical function division. In actual implementation, another division manner may be used. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 6:
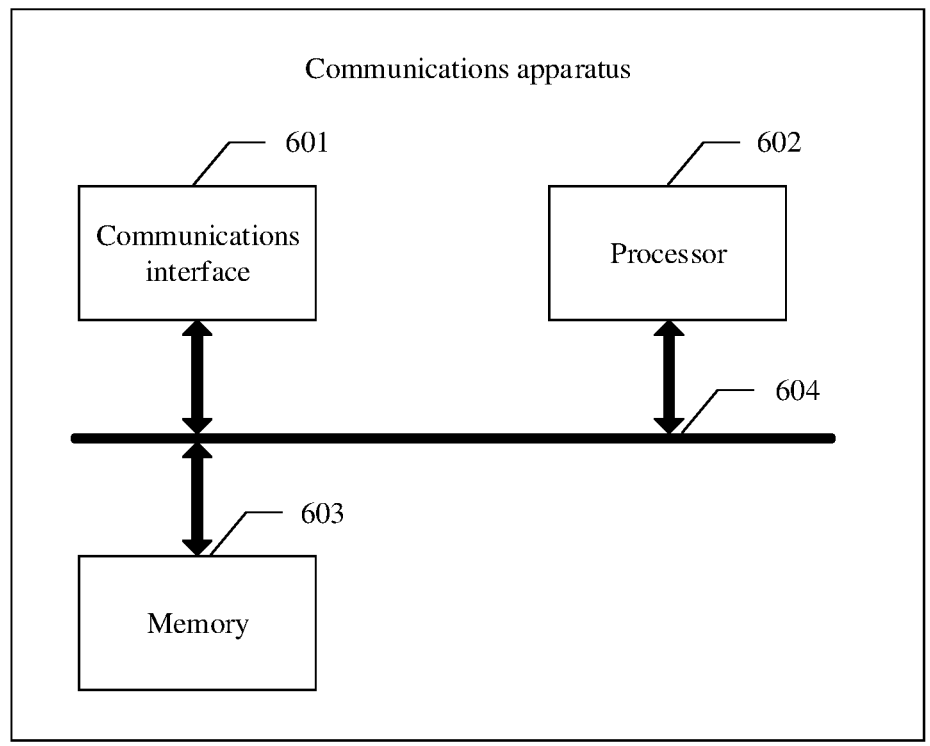
FIG. 6 is a schematic diagram of a structure of a terminal device according to an embodiment of this application.

When the integrated module may be implemented in the form of hardware, the communications apparatus may be shown in FIG. 6, and the processing unit 501 may be a processor 602. The processor 602 may be a central processing module (central processing unit, CPU), a digital processing module, or the like. The receiving unit 502 may be a communications interface 601. The communications interface 601 may be a transceiver, or may be an interface circuit such as a transceiver circuit, or may be a transceiver chip, or the like. The communications apparatus further includes a memory 603, configured to store a program executed by the processor 602. The memory 603 may be a nonvolatile memory, for example, a hard disk (hard disk drive, HDD) or a solid-state drive (solid-state drive, SSD), or may be a volatile memory (volatile memory), for example, a random access memory (random-access memory, RAM). The memory 603 is any other medium capable of carrying or storing expected program code in a form of instructions or data structures and capable of being accessed by a computer, but is not limited thereto.

The processor 602 is configured to execute the program code stored in the memory 603, and is specifically configured to perform an action of the foregoing processing unit 501. Details are not described herein again in this application.

A specific connection medium between the foregoing communications interface 601, processor 602, and memory 603 is not limited in this embodiment of this application. In this embodiment of this application, in FIG. 6, the memory 603, the processor 602, and the communications interface 601 are connected by using a bus 604. The bus is represented by using a thick line in FIG. 6. A connection manner between other components is merely an example for description, and is not limited thereto. The bus may be classified into an address bus, a data bus, a control bus, and the like. For ease of representation, only one thick line is used to represent the bus in FIG. 6, but this does not mean that there is only one bus or only one type of bus.

Figure 7:
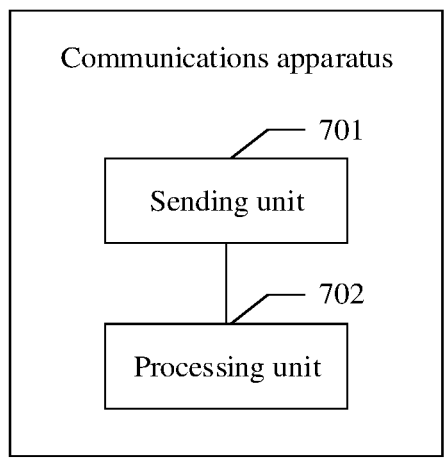
FIG. 7 is a schematic diagram of a structure of a network device according to an embodiment of this application.

Based on a same inventive concept as the method embodiment, an embodiment of this application provides a network device, specifically configured to implement the method described in the embodiment in FIG. 2. The device may be the network device, or may be a chip, a chipset, or a part of the chip in the network device, and the part of the chip is configured to perform a related method function. A structure of the network device may be shown in FIG. 7, and the network device includes a sending unit 701 and a processing unit 702.

In an implementation, the processing unit 702 is configured to before a terminal device enters a connected mode or when the terminal device is in a connected mode, send, via the sending unit 701, a TA to the terminal device, and when releasing the terminal device to enter an idle mode, send, via the sending unit 701, a TA or indication information to the terminal device, where the indication information is used to indicate the terminal device to store a TA in the connected mode when the terminal device is switched from the connected mode to the idle mode. The processing unit 702 is configured to control the sending unit to send information.

The sending unit 701 may be further configured to send at least one of the following parameters to the terminal device: an adjustment value, a first difference, a second difference, and a threshold. The adjustment value is used by the terminal device to adjust a maximum timing value of a TA timer based on the adjustment value. The first difference is used to be compared with an absolute value of a difference between a first parameter of the terminal device and a reference value, so that the terminal device determines whether the obtained TA is valid, where the first parameter is information related to a location of the terminal device. The second difference is used to be compared with the absolute value of the difference between the first parameter and the reference value, so that the terminal device determines whether to adjust the TA timer. The threshold is used to be compared with the first parameter, so that the terminal device determines whether to adjust the TA timer.

The sending unit 701 may be further configured to send a reference signal to the terminal device.

In another implementation, the processing unit 702 is configured to before a terminal device enters a connected mode or when a terminal device is in a connected mode, send, via the sending unit 701, a TA to the terminal device, and send, via the sending unit 701, at least one of the following parameters to the terminal device: an adjustment value, a first difference, a second difference, and a threshold. The processing unit 702 is configured to control the sending unit to send information. The adjustment value is used by the terminal device to adjust a maximum timing value of a TA timer based on the adjustment value. The first difference is used to be compared with an absolute value of a difference between a first parameter of the terminal device and a reference value, so that the terminal device determines whether the obtained TA is valid, where the first parameter is information related to a location of the terminal device. The second difference is used to be compared with the absolute value of the difference between the first parameter and the reference value, so that the terminal device determines whether to adjust the TA timer. The threshold is used to be compared with the first parameter, so that the terminal device determines whether to adjust the TA timer.

The sending unit 701 may also be configured to send a reference signal to the terminal device.

Division into modules in this embodiment of this application is an example, and is merely a logical function division. In actual implementation, another division manner may be used. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 8:
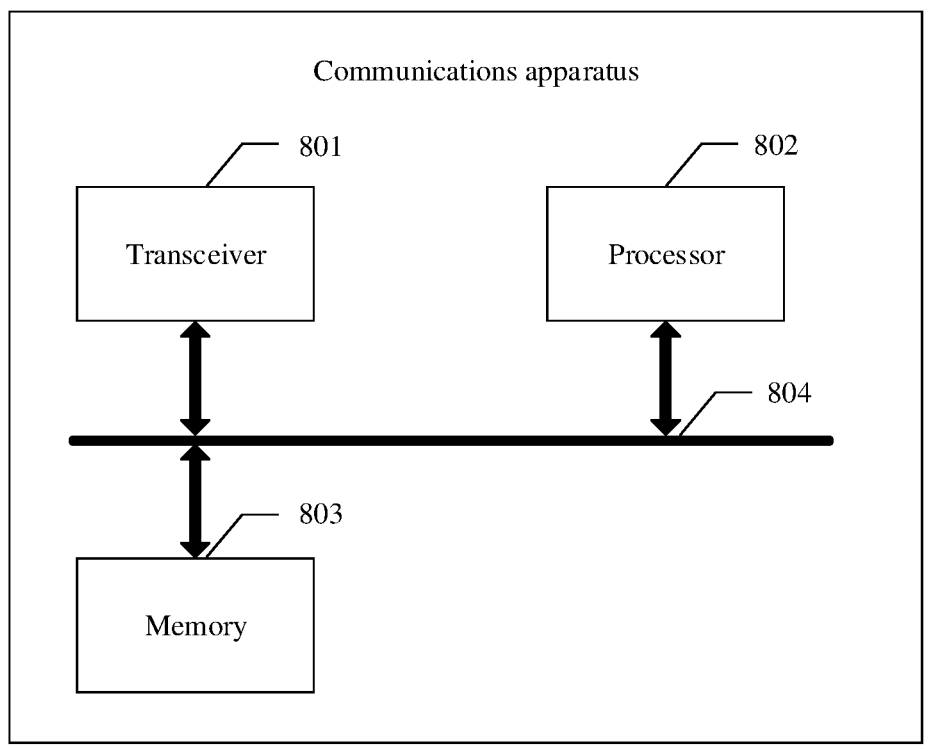
FIG. 8 is a schematic diagram of a structure of a network device according to an embodiment of this application.

When the integrated module may be implemented in the form of hardware, the communications apparatus may be shown in FIG. 8, and the processing unit 702 may be a processor 802. The processor 802 may be a CPU, a digital processing module, or the like. The sending unit 701 may be a communications interface 801. The communications interface 801 may be a transceiver, or may be an interface circuit such as a transceiver circuit, or may be a transceiver chip, or the like. The network device further includes a memory 803, configured to store a program executed by the processor 702. The memory 803 may be a non-volatile memory, for example, an HDD or an SSD, or may be a volatile memory, for example, a RAM. The memory 803 is any other medium capable of carrying or storing expected program code in a form of instructions or data structures and capable of being accessed by a computer, but is not limited thereto.

The processor 802 is configured to execute the program code stored in the memory 803, and is specifically configured to perform an action of the foregoing processing unit 702. Details are not described herein again in this application.

A specific connection medium between the foregoing communications interface 801, processor 802, and memory 803 is not limited in this embodiment of this application. In this embodiment of this application, in FIG. 8, the memory 803, the processor 802, and the communications interface 801 are connected by using a bus 804. The bus is represented by using a thick line in FIG. 8. A connection manner between other components is merely an example for description, and is not limited thereto. The bus may be classified into an address bus, a data bus, a control bus, and the like. For ease of representation, only one thick line is used to represent the bus in FIG. 8, but this does not mean that there is only one bus or only one type of bus.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

It is clear that a person skilled in the art can make various modifications and variations to the embodiments of this application without departing from the spirit and scope of the embodiments of this application. In this case, this application is intended to cover these modifications and variations in the embodiments of this application, provided that they fall within the scope of the following claims and their equivalent technologies.

What is claimed is:

1. A communication method, comprising:
    obtaining, by a terminal device, a timing advance (TA);
    determining, by the terminal device according to a preset rule and first information, whether the TA is valid, wherein the first information comprises a first parameter, and wherein the first parameter is information related to a location of the terminal device;
    adjusting a TA timer by the terminal device in response to the first information meeting a third condition, wherein the third condition comprises the TA timer not being expired, and further comprises an absolute value of a difference between the first parameter and an absolute value of a reference value being less than or equal to a third difference; and
    performing at least one of:
        determining, by the terminal device, in response to the TA being invalid, that uplink data transmission cannot be performed; or
        determining, by the terminal device, in response to the TA being valid, that the TA can be used for uplink data transmission.

2. The method according to claim 1, wherein the method further comprises performing, before the determining whether the TA is valid:
    measuring, by the terminal device, a current reference signal received power (RSRP) of a serving cell, wherein the first parameter is the current RSRP that is of the serving cell and that is obtained by the terminal device through measurement.

3. The method according to claim 1, wherein the determining whether the TA is valid comprises performing at least one of:
    performing, according to a second difference that is an absolute value of a difference between the first parameter and the reference value, at least one of:
        determining, by the terminal device, that the TA is invalid in response to the second difference being greater than or equal to a first difference; or
        determining, by the terminal device, that the TA is valid in response to the second difference being less than the first difference; or
    performing, according to the second difference, at least one of:
        determining, by the terminal device, that the TA is invalid in response to the second difference being greater than the first difference; or
        determining, by the terminal device, that the TA is valid in response to the second difference being less than or equal to the first difference;
    wherein the first difference is at least one of preconfigured by the terminal device or is from a network device to the terminal device.

4. The method according to claim 3, wherein the reference value is a reference signal received power (RSRP) obtained by the terminal device through measurement for a serving cell when the terminal device accesses the serving cell;
    wherein the reference value is an RSRP obtained by the terminal device through at least one of measurement for the serving cell after the terminal device obtains the TA, or
    measurement that is previous to a current RSRP measurement of the serving cell.

5. The method according to claim 1, wherein the first information further comprises information about the TA timer, and wherein the determining whether the TA is valid comprises performing at least one of:
    performing, according to a first condition that is that the TA timer does not expire, and that an absolute value of a difference between the first parameter and the reference value is less than or equal to a second difference:

determining, by the terminal device, that the TA is valid in response to the first information meeting the first condition; or determining, by the terminal device, that the TA is invalid in response to the first information not meeting the first condition; or performing, according to a second condition that is that the TA timer does not expire, and the absolute value of the difference between the first parameter and the reference value is less than the second difference:

determining, by the terminal device, that the TA is valid in response to the first information meeting the second condition; or determining, by the terminal device, that the TA is invalid if the first information not meeting the second condition;

wherein the second difference is at least one of preconfigured by the terminal device or is from a network device to the terminal device.

6. The method according to claim 5, wherein the adjusting the TA timer comprises performing at least one of restarting, by the terminal device, the TA timer or increasing a maximum timing value of the TA timer.

7. The method according to claim 6, wherein the third difference is less than or equal to the second difference.

8. The method according to claim 6, wherein the third condition further comprises the first parameter being greater than or equal to a threshold, and wherein the threshold is preconfigured by the terminal device or is from the network device to the terminal device.

9. The method according to claim 5, wherein the terminal device is in an idle mode, and wherein the method further comprises:

continuing timing, by the terminal device, by maintaining a TA timer in a connected mode; or continuing timing, by the terminal device, by maintaining a TA timer in a connected mode, receiving an adjustment value from the network device, and adjusting a maximum timing value of the TA timer in the connected mode according to the adjustment value; or starting, by the terminal device, a new TA timer.

10. The method according to claim 9, wherein the method further comprises obtaining the TA comprises performing at least one of:

receiving, by the terminal device, as part of the obtaining the TA, a TA from the network device in response to the network device releasing the terminal device to enter the idle mode; or performing, before the obtaining the TA:

receiving, by the terminal device, before the terminal device enters the connected mode or when the terminal device is in the connected mode, a TA from the network device; and receiving, by the terminal device, indication information from the network device when the network device releases the terminal device to enter the idle mode, wherein the indication information indicates to the terminal device to store the TA in the connected mode when the terminal device is switched from the connected mode to the idle mode; and obtaining the stored TA as part of the obtaining the TA.

11. A communication method, comprising:

sending, by a network device, before a terminal device enters a connected mode or when the terminal device is in the connected mode, a timing advance (TA) to the terminal device;

sending, by the network device, at least one of the TA or indication information to the terminal device when releasing the terminal device to enter an idle mode, wherein the indication information indicates to the terminal device to store the TA in the connected mode when the terminal device is switched from the connected mode to the idle mode; and sending, by the network device, an adjustment value to the terminal device, wherein the adjustment value causes the terminal device to adjust a TA timer according to the adjustment value and in response to first information meeting a condition that comprises the TA timer not being expired, and that further comprises an absolute value of a difference between a first parameter pf the first information, and an absolute value of a reference value being less than or equal to a third difference, wherein the first parameter comprises information related to a location of the terminal device.

12. A communications apparatus, comprising:

a processor; and a non-transitory computer readable medium connected to the processor and storing a program for execution by the processor, the program including instructions to:

obtain a timing advance (TA);

determine, according to a preset rule and first information, whether the TA is valid, wherein the first information comprises a first parameter, and wherein the first parameter is information related to a location of the apparatus;

adjust a TA timer in response to the first information meeting a third condition, wherein the third condition comprises the TA timer not being expired, and further comprises an absolute value of a difference between the first parameter and an absolute value of a reference value being less than or equal to a third difference; and perform at least one of determine that uplink data transmission cannot be performed in response to the TA being invalid; or determine that the TA can be used for uplink data transmission in response to the TA being valid.

13. The apparatus according to claim 12, wherein the program further includes instructions to:

measure a current reference signal received power (RSRP) of a serving cell via a receiver of the apparatus before the determining whether the TA is valid, wherein the first parameter is the current RSRP that is of the serving cell and that is obtained by the processor through measurement.

14. The apparatus according to claim 13, wherein the first information further comprises information about a TA timer; and wherein the instructions to determine whether the TA is valid include instructions to perform at least one of:

perform, according to a first condition that is that the TA timer does not expire, and that an absolute value of a difference between the first parameter and the reference value is less than or equal to a second difference, at least one of:

determine that the TA is valid in response to the first information meeting the first condition; or determine that the TA is invalid in response to the first information not meeting the first condition; or perform, according to a second condition that is that the TA timer does not expire, and the absolute value of the difference between the first parameter and the reference value is less than the second difference, at least one of:
  determine that the TA is valid in response to the first information meeting the second condition; or
  determine that the TA is invalid in response to the first information not meeting the second condition;
wherein the second difference is at least one of preconfigured by the apparatus or is from a network device to the communications apparatus.

15. The apparatus according to claim 14, wherein the reference value is at least one of a reference signal received power (RSRP) obtained by the apparatus, through measurement, for a serving cell when the apparatus accesses the serving cell, an RSRP obtained by the apparatus through measurement for the serving cell after the apparatus obtains the TA, or an RSRP obtained by the apparatus through RSRP measurement previous to current RSRP measurement of the serving cell.

16. The apparatus according to claim 15,
  wherein the instructions to adjust the TA timer include instructions to perform at least one of restart the TA timer or increase a maximum timing value of the TA timer.

17. The apparatus according to claim 15, wherein the communications apparatus is in an idle mode, and program further includes instructions to perform at least one of:
  continue timing by maintaining a TA timer in a connected mode;
  continue timing by maintaining a TA timer in a connected mode receive an adjustment value from the network device, and adjust a maximum timing value of the TA timer in the connected mode according to the adjustment value; or
  start a new TA timer.

18. The apparatus according to claim 12, wherein the instructions to obtain the TA include instructions to perform at least one of:
  receive the TA from a network device in response to the network device releasing the apparatus to enter an idle mode; or
  perform, before the apparatus enters a connected mode or when the apparatus is in the connected mode:
    receive a TA from the network device; and
    receive indication information from the network device when a network releases the apparatus to enter the idle mode, wherein the indication information indicates to the apparatus to store the TA in the connected mode when the apparatus is switched from the connected mode to the idle mode; and
  wherein the instructions to obtain the TA include instructions to obtain the stored TA.

19. The apparatus according to claim 12, wherein the instructions for determining whether the TA is valid include instructions to perform at least one of:
  perform, according to a second difference that is an absolute value of a difference between the first parameter and the reference value, at least one of:
    determine that the TA is invalid in response to the second difference being greater than or equal to a first difference; or
    determine that the TA is valid in response to the second difference being less than the first difference; or
  performing, according to the second difference, at least one of:
    determine that the TA is invalid in response to the second difference being greater than the first difference; or
    determine that the TA is valid in response to the second difference being less than or equal to the first difference, wherein
the first difference is preconfigured by the communications apparatus or is from a network device to the communications apparatus.

20. A communications apparatus, comprising:
  a processor; and
  a transmitter;
  a non-transitory computer readable medium connected to the processor and storing a program for execution by the processor, the program including instructions to:
    send, via the transmitter, before a terminal device enters a connected mode or when the terminal device is in a connected mode, a timing advance (TA) to the terminal device;
    send, via the transmitter, when releasing the terminal device to enter an idle mode, a TA or indication information to the terminal device, wherein the indication information indicates to the terminal device to store a TA in the connected mode when the terminal device is switched from the connected mode to the idle mode; and
  send, via the transmitter, an adjustment value to the terminal device, wherein the adjustment value causes the terminal device to adjust a TA timer according to the adjustment value and in response to first information meeting a condition that comprises the TA timer not being expired, and that further comprises an absolute value of a difference between a first parameter of the first information and an absolute value of a reference value being less than or equal to a third difference, wherein the first parameter comprises information related to a location of the terminal device.

* * * * *